Aug. 11, 1953
A. B. YOUNGS
2,648,271
GAUGE WHEEL ATTACHMENT FOR TOOL CARRIERS
Filed June 18, 1948
3 Sheets-Sheet 1
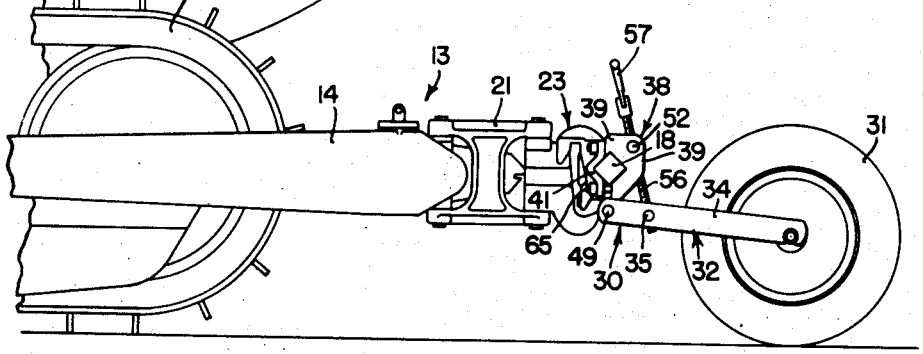
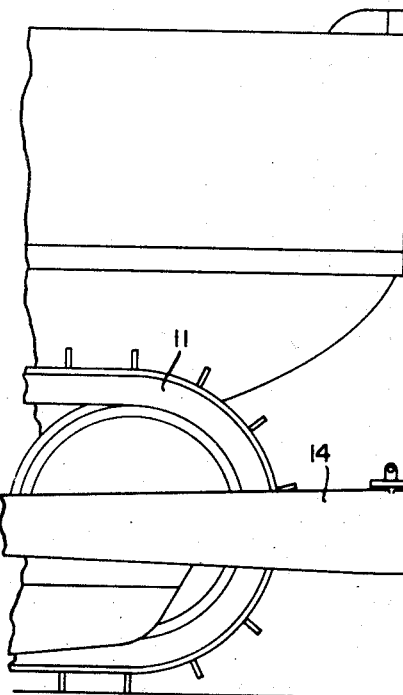
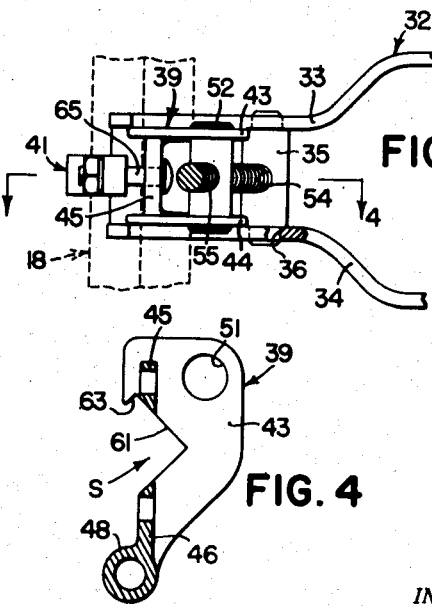
INVENTOR.
ALFRED B. YOUNGS
BY
ATTORNEYS

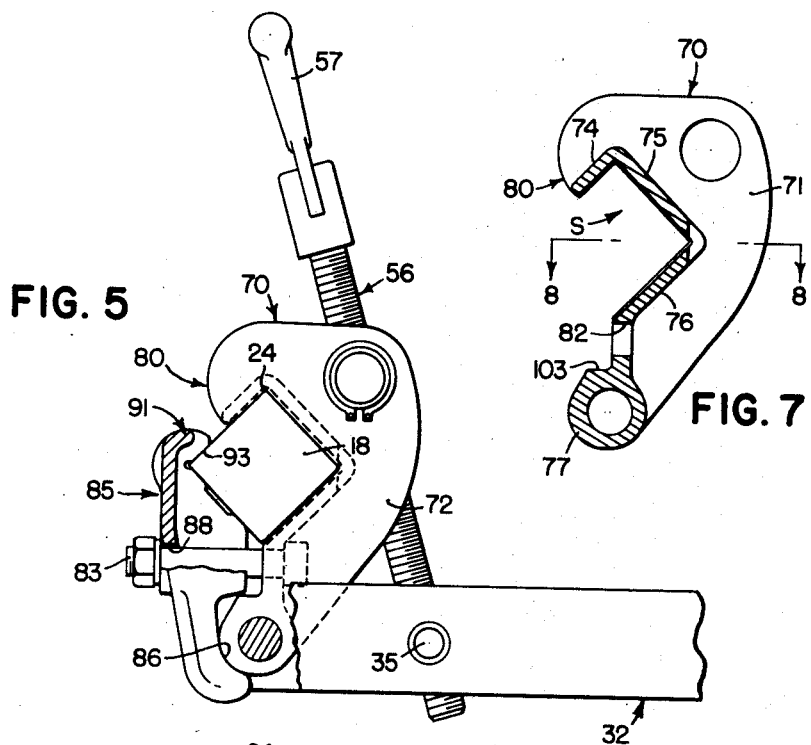
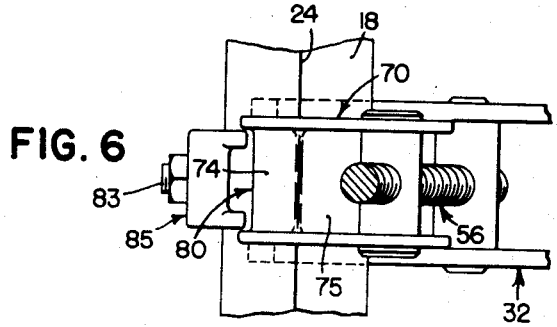
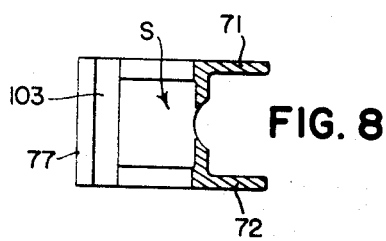

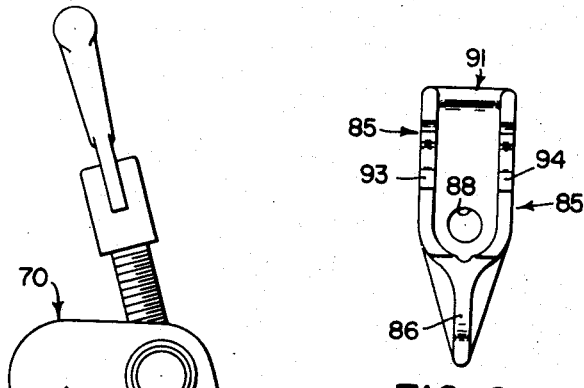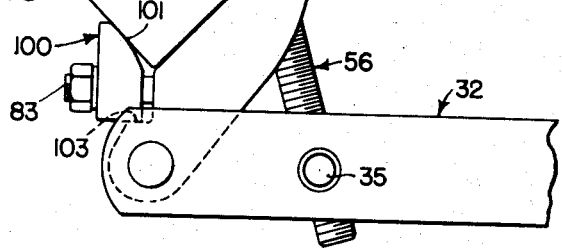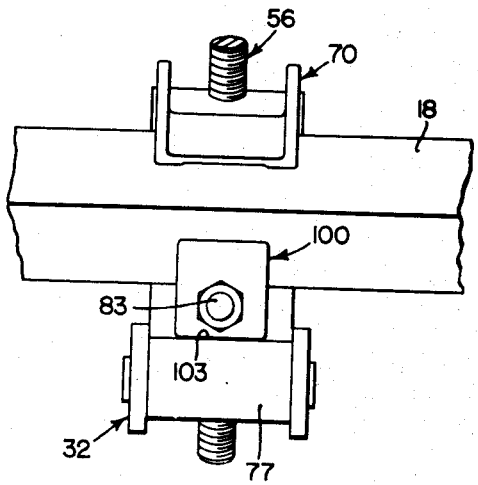

Patented Aug. 11, 1953

2,648,271

UNITED STATES PATENT OFFICE 2,648,271

GAUGE WHEEL ATTACHMENT FOR TOOL CARRIERS

Alfred Byron Youngs, Yakima, Wash., assignor, by mesne assignments, to Deere & Company, Moline, Ill., a corporation of Illinois Application June 18, 1948, Serial No. 33,813

4 Claims. (Cl. 97—189)

The present invention relates generally to agricultural implements and more particularly to implements of the ground working type.

The object and general nature of the present invention is the provision of a new and improved gauge wheel attachment for implements of the tool bar type. In implements of this kind, a transverse relatively heavy tool-receiving bar is mounted for generally vertical movement on a prime mover, such as a tractor or the like, and usually there are various kinds, sizes and the like of ground working tools provided for attachment to the tool bar, the particular tool or tools selected being governed by the kinds and/or amount of work to be done. In most cases, however, it is desirable to provide some kind of gauge wheel unit preferably attachable to the tool bar for limiting and controlling the depth of operation of the tool or tools. It is, therefore, a further and important feature of this invention to provide a gauge wheel attachment for tool bar implements, so constructed and arranged as to be readily attachable and detachable from the tool bar and embodying means whereby the depth of operation of the tool or tools may readily be adjusted as desired.

More specifically, it is a feature of this invention to provide a gauge wheel attachment which includes a new and improved clamp whereby at least a portion of the attachment may temporarily be engaged with and supported on the tool bar while attaching the gauge wheel unit, so that both hands of the operator are free to tighten and/or adjust the clamping means and associated parts, it not being necessary for the operator to manually support any of the parts during this attaching operation.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a side view showing my new and improved gauge wheel attachment as mounted on the tool bar carrier of a crawler tractor.

Figure 2 is an enlarged fragmentary side view, showing certain details of the clamping means.

Figure 3 is a plan view taken generally along the line 3—3 of Figure 2.

Figure 4 is a sectional view of the clamp taken generally along the line 4—4 of Figure 3.

Figure 5 is a side view and Figure 6 a top view of a modified form of gauge wheel support.

Figure 7 is a sectional view of the main clamp member shown in Figures 5 and 6.

Figure 8 is a sectional view taken along the line 8—8 of Figure 7.

Figure 9 is an inner face view of the auxiliary clamping member.

Figures 10 and 11 are side and front views of another form of the present invention.

For the purpose of illustration the present invention has been shown as used with a tractor 10 of the crawler or track-laying type having treads or tracks 11 operatively connected with the main body of the tractor 10 and driven by the tractor motor. The tractor 10 receives and supports a tool carrier which is indicated in its entirety by the reference numeral 13 and which in general comprises right and left hand side arms 14 suitably connected together at their rear ends by a cross bar structure to which a tool support, preferably in the form of a transversely arranged square tool bar 18, is connected in any suitable way, as by a pair of laterally swingable links 21 connected at their forward ends with the cross bar structure and at their rear ends with the tool-receiving bar 18 by supporting clamps 23. Preferably, the tool-receiving transverse bar 18 is arranged diagonally, that is, with its upper and lower edges arranged in a vertical plane, the upper edge being indicated in Figure 2 by the reference numeral 24.

Referring now to the gauge wheel attachment, with which the present invention is more particularly concerned, the attachment is indicated in its entirety by the reference numeral 30 and comprises a gauge wheel 31 mounted for rotation by suitable bearing means at the rear end of a gauge wheel arm 32. The latter member is made up of a pair of right and left hand bars 33 and 34 spaced apart rearwardly to receive the wheel 31 and spaced apart forwardly and apertured to receive a transversely disposed trunnion member 35 rockably mounted in apertures 36 formed in the forward portions of the bars 33 and 34.

The gauge wheel arm 32 is pivotally connected, as will be pointed out in more detail below, to a clamp 38 attachable to and shiftable generally laterally on the tool bar 18. The clamp unit 38 comprises a main clamp member 39 and a cap member 41. The clamp member 39, as best shown in Figures 3 and 4, comprises a pair of side wall sections 43 and 44 spaced apart by upper and lower web sections 45 and 46. At its lower portion the web section 46 joins with the lower portions of the side wall sections to form a laterally disposed sleeve 48 in which a pivot member 49 is rockably disposed. The pivot member 49 is secured, as by welding, to the forward ends of the gauge wheel arm members 33 and 34, the latter members being disposed at the outer sides of the bearing sleeve section 43 of the clamping member 39.

At their upper ends the side wall sections 43 and 44 are apertured, as indicated at 51, to rockably receive an upper trunnion member 52. The lower trunnion member 35 and the upper trunnion member 52 are provided with transverse screw threaded openings, as indicated at 54 and 55, in which a crank screw member 56 is disposed, the member 56 including a handle section 57 pivoted at 58 to the upper end of the screw threaded member 56. Turning the latter in one direction or the other serves to change the angular relationship between the clamping member 39 and the gauge wheel arm 32.

At one side of the member 39, such as the forward side, the side wall sections 43 and 44 are notched, as indicated at 61, to provide a forwardly facing socket S shaped to receive the rear side of the transverse tool bar 18. At their forward upper portions, each of the side wall sections 43 and 44 is provided with an overhanging lip portion 63 which engages over the upper edge 24 of the tool bar 18. Each of the upper and lower web sections 45 and 46 is apertured to receive the head end of a clamping bolt 65 on which the cap member 41 is disposed. The cap member 41 is shaped to receive and embrace the forward side of the transverse tool bar 18.

The construction just described materially facilitates the attachment and detachment of the gauge wheel unit. For example, when attaching the same the operator is not required to manually hold the unit in position while connecting the cap member 41 around the bar 18. According to the principles of the present invention, all the operator has to do is to support the wheel 31 on the ground and then lift the part 38, with the cap 41 loosened, into position on the bar 18, hooking the lip portion 63 over the upper edge or corner 24 of the bar. Since the pivot 49 is substantially directly underneath the lip section 63, the clamp 39 will remain on the bar 18 leaving the operator free to use both hands to place the cap 41 in position and tighten the nuts on the bolts 65. The provision of the overhanging or hook-like portion 63 makes lateral adjustment along the tool bar 18 easy of accomplishment because the cap 41 need be only loosened to permit the clamp 39 to be shifted laterally along the bar 18 without binding.

A modified form of the present invention is shown in Figures 5-8. In this form of the invention, the main clamping member is indicated by the reference numeral 70 and comprises side walls 71 and 72 connected together by three central connecting web sections 74, 75 and 76, as best shown in Figure 7. The lower portion of the lower web and side walls are provided with a bearing sleeve 77 of substantially the same construction as the bearing sleeve 48 shown and described above. The wall sections 74, 75 and 76 are disposed at right angles to one another, and the upper portions of the wall sections 74 and 75 cooperate with the side wall sections 71 and 72 to form an overhanging lip portion 80 which is adapted to engage over the upper edge 24 of the tool bar 18, as best shown in Figure 5.

The main clamp member 70 is provided at its lower portion with a transverse bolt hole 82 (Figure 7) in which the head end of a bolt 83 is disposed. Mounted on the bolt 83 is a companion clamp member 85 which is rounded, as shown at 86, at its lower end and shaped to bear against the forward rounded portion of the bearing sleeve section 77. The clamp member 85 is apertured, as at 88, to receive the clamping bolt 83. The clamping member 85 is provided with an upper nose portion 91 which engages over the adjacent corner of the tool bar 18, as best shown in Figure 5 so that, when the bolt 83 is tightened, the two clamp members 70 and 85 are firmly and rigidly fixed in position. The overhanging lip portion 80 of the main clamp member 70 permits the clamp end of the gauge wheel unit to be hooked over the tool bar 18 when installing or removing the gauge wheel unit, thus leaving both hands of the operator free to perform the tightening and adjusting action, substantially the same as described above in connection with the form of the invention shown in Figures 1–4. As best shown in Figure 9, the lower or rounded portion 86 of the clamp member 85 is relatively narrow providing a substantially three-point engagement with the tool bar 18 and bearing sleeve section 77 since the upper nose portion 91 of the clamping member 85 includes bar-engaging V-shaped notches 93 and 94 in the side wall portions of the member 85.

A further modified form of the present invention is shown in Figures 10 and 11. Instead of providing a clamping member, such as the one shown at 85 in Figures 5–9, which engages the single clamping bolt and has a nose portion hooking over the forward edge or corner of the bar 18, the clamping member shown in Figures 10 and 11 and indicated by the reference numeral 100 comprises a block having a beveled edge 101 and an aperture to receive the clamping bolt 83. The block 100 lies against the lower forward edge of the bar 18 and, when the bolt 83 is tightened, acts against the lower forward face of the bar to secure the main clamping member 70 in position. The block preferably is formed so as to rest at its lower edge against the upper shoulder 103 lying at the upper side of the bearing sleeve section 77 (see Figure 7).

While I have shown and described above the preferred form in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

1. In an agricultural machine having a tool-receiving bar, a gauge wheel unit attachable to said bar for gauging the depth of operation of the tool or tools connected to said bar, said gauge wheel unit comprising an arm, a gauge wheel rotatably mounted at one end of said arm, a clamp adapted to be secured to said bar and comprising a part disposable generally vertically and having a bar-receiving socket at one side of said part, a lower portion to which the other end of said gauge wheel arm is pivoted, and an overhanging lip portion adapted to engage over said bar, when the latter is seated loosely in said socket, in contact with at least a portion of the side of said bar opposite the side of the bar that is received in said socket, said overhanging lip portion and said lower portion to which said other end of the gauge wheel arm is pivoted being disposed in substantially vertical alignment with said arm-receiving lower portion lying substantially directly underneath said overhanging lip portion whereby, when the wheel is supported on the ground or the like, said overhanging lip portion serves to temporarily support said clamp part and the adjacent portions of said gauge wheel arm on said bar to facilitate connection of said gauge wheel unit with said bar, and a clamping member connected with said part and engaging said opposite side of said bar for fixing said clamping part to said bar.

2. In an agricultural machine having a generally horizontal tool-receiving bar, a gauge wheel unit attachable to said bar for gauging the depth of operation of the tool or tools connected therewith, said gauge wheel unit comprising an arm, a gauge wheel rotatably mounted at one end of said arm, a clamp adapted to be secured to said bar and comprising a first part disposable generally vertically along one side of the bar, said part comprising a member having at one side a bar-receiving socket and at its upper portion an overhanging lip section adapted to engage over the upper portion of said bar, said member also having at its lower portion a transverse sleeve section disposed below but generally in vertical alignment with said lip portion, clamping means including means engageable with the other side of the bar and connectible with said first part for clamping the latter to said bar, means for pivotally connecting the other end of said gauge wheel arm to said sleeve portion, and gauge wheel adjusting means, comprising a pair of relatively movable parts, connected, respectively, with said first part and said arm, and adjustable means for holding said parts against relative movement in different positions, said gauge wheel adjusting means thus serving to hold said first part and said arm against relative movement when said first part is disconnected from said bar.

3. In an agricultural machine having a tool-receiving bar generally square in cross section and normally disposed in a diagonal position with an edge of the bar uppermost, a gauge wheel unit attachable to said bar for gauging the depth of operation of the tool or tools connected therewith, said gauge wheel unit comprising an arm, a gauge wheel rotatably mounted at one end of said arm, a clamp adapted to be secured to said bar and comprising a part disposable generally vertically and having at its lower end a transverse sleeve section and notched at one side to provide a bar-receiving socket for mounting said part against one side of said square bar when arranged in said diagonal position, said part also having at its upper end an overhanging lip portion embracing said upper edge of said bar and disposed substantially vertically above said sleeve section, means for pivotally connecting the other end of said gauge wheel arm to said part, clamping bolt means connected with the latter, a clamping member receiving said clamping bolt means and engaging said opposite side of said bar for fixing said clamping part to said bar, and means separate from said bolt means and said clamping member for rigidly interconnecting said part with said gauge wheel arm independently of said clamping member and said bolt means, whereby said part remains connected with said gauge wheel arm when said clamping member and said bolt means are loosened, whereby one end of said arm may be supported on said tool-receiving member by said lip portion even though said clamping member and bolt means are loosened or removed from said clamping part.

4. In an agricultural machine having a tool-receiving bar, a wheel unit attachable to said bar, said gauge wheel unit comprising an arm, a wheel rotatably mounted at one end of said arm, a clamp adapted to be secured to said bar and comprising a part disposable generally vertically along one side of the bar, said part comprising a member having at one side a bar-receiving socket and at its upper portion an overhanging lip section adapted to engage over the upper portion of said bar, said member also having at its lower portion a section disposed below but generally in vertical alignment with said lip portion, means connecting the other end of said arm to said lower section, whereby one end of said arm may be supported on said tool-receiving member by said lip portion, and clamping means including means engageable with the other side of the bar and connectible with said part for clamping the latter to said bar.

ALFRED BYRON YOUNGS.

References Cited in the file of this patent

UNITED STATES PATENTS

| Number | Name | Date |
| --- | --- | --- |
| 521,272 | Schauman | June 12, 1894 |
| 1,575,011 | Seaholm | Mar. 2, 1926 |
| 2,196,037 | Silver | Apr. 2, 1940 |
| 2,203,022 | Kamplade | June 4, 1940 |
| 2,259,890 | Hipple | Oct. 21, 1941 |
| 2,426,529 | Silver | Aug. 26, 1947 |

FOREIGN PATENTS

| Number | Country | Date |
| --- | --- | --- |
| 656,537 | France | Jan. 2, 1929 |